Nov. 10, 1964 F. JONKER 3,156,137

SUPERIMPOSABLE CARD SYSTEM WITH TEMPLATE AND GUIDED DRILL

Filed Nov. 1, 1961

INVENTORS
FREDERICK JONKER
WILLIAM P. GINGRAS

BY Homer R. Montague
ATTORNEY

1

3,156,137
SUPERIMPOSABLE CARD SYSTEM WITH TEMPLATE AND GUIDED DRILL

Frederick Jonker, Washington, D.C., and William P. Gingras, Rockville, Md., assignors to Jonker Business Machines, Inc., a corporation of Delaware Filed Nov. 1, 1961, Ser. No. 149,441
4 Claims. Cl. (77—27)

This invention pertains to information retrieval systems based on the use of superimposable cards dedicated to terms and the determination of coincidence of holes in said cards. These systems are also known as Peekaboo Systems. Commercially they are known as Termatrex systems.

In the Termatrex systems, an item of information is prepared for entry into the system by first indexing it by a number of terms taken from a vocabulary of terms. Each item of information is given an accession number.

Termatrex systems comprise a number of cards each dedicated to a term. In total there will generally be a vocabulary of between 500 and 5000 terms. On each termcard there generally is one place dedicated to a document in the collection. Each document has the same position dedicated to it on each termcard.

Items of information are entered into a Termatrex system by selecting all of the termcards by which that item has been indexed and punching all of these cards at the position dedicated to that item of information. Terms can be words, classes, letters, numerals or any description or properties of any kind. The "vocabulary" of terms usually ranges between 500 and 5000.

The dedication of positions on the termcards to documents is usually, but not necessarily, based on an $x$—$y$ coordinate system.

A search is made by selecting a number of cards corresponding to the search terms, usually three to five cards, superimposing the same and scanning these for coinciding holes in all of the superimposed cards. After that, these cards are placed back in the files.

The present invention is a continuation-in-part of an earlier invention of U.S. Patent 3,052,150.

That invention describes a data input and readout device where the data input is performed by a hand-held drill cooperating with a template or a movable ruler provided with guide holes for the drill.

The invention will now be explained with reference to the following figures.

Figure 1:
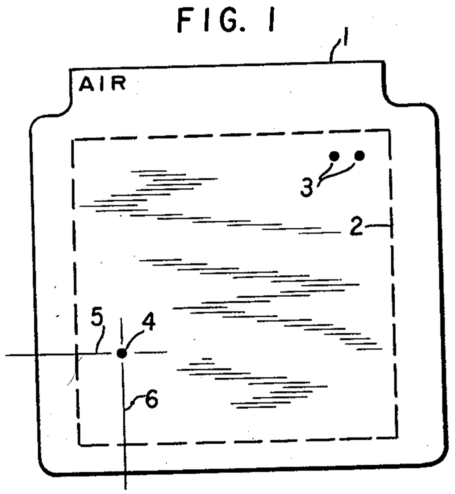
FIGURE 1 shows an example of a card.

Numeral 1 in FIGURE 1 designates a termcard. The area 2 is the area within which positions are dedicated to documents. Numeral 3 designates holes dedicated to documents. Frequently this dedication is done on an $x$—$y$ coordinate basis. For example, if the area 2 contains a matrix of 100 x 100 positions and the coordinate positions of the hole designated by numeral 4 designated respectively by numerals 5 and 6 are respectively 17 and 35, then that position on each of all of the termcards is dedicated to document #3517.

Figure 2:
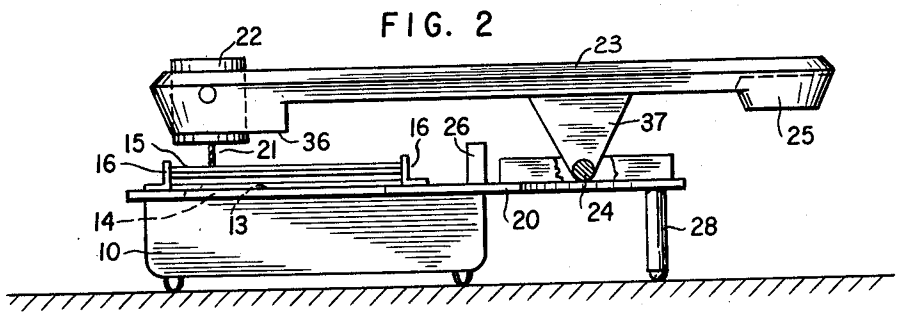
FIGURE 2 shows a side view partially in cross-section of an embodiment of the invention.
Figure 3:
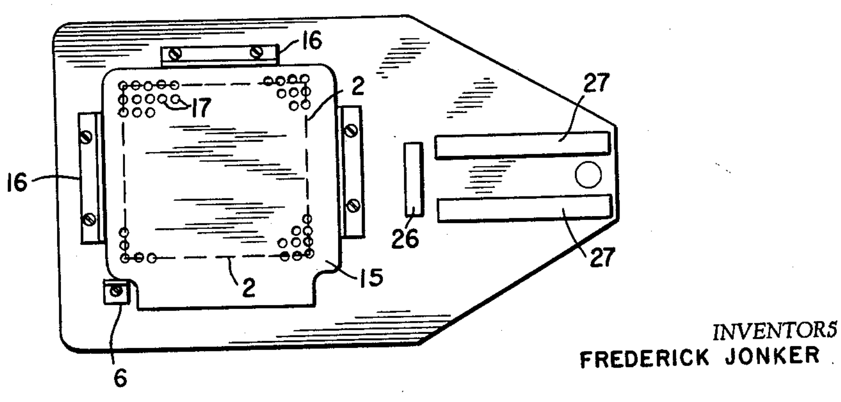
FIGURE 3 shows a top view of the embodiment of FIGURE 2.

FIGURES 2 and 3 show a device according to the invention, comprising a lightbox 10 with, for example, a fluorescent light source therein. The top plate 20 has an opening 14 closed off by a translucent diffusion plate 13. On top of this diffusion plate, held accurately in superimposition between brackets 16, are a plurality of termcards 1. On top of this assembly fits a drill template 15 having as many holes 17 as there are dedicated positions on the cards.

2

A horizontal arm 23 is disposed to slide over an extension of the top plate 20, supported on a support 28. One end of arm 23 carries a rigidly mounted drill motor 22 driving a twist drill 21. The arm is supported on support 37, which can slide over the top plate 20. Support 37 has a rounded tip that can serve as a pivot point or a set of rollers 24 as shown in FIG. 2. At the other end of arm 23 is a counterweight 25.

Two pieces 27 channel the movements back and forth of arm 23, thereby giving plenty of freedom to turn left or right. A support 26 is disposed in such a manner that when the drill is not in use, section 36 of the drill arm can be made to rest on support 26. FIG. 3 shows a top view of the device with the drillmotor arm 23 removed.

What is claimed is:

1. Apparatus for selectively drilling code perforations in data record cards of the coordinate-index type, comprising a housing having a flat upper support plate, data-card locating formations on said plate to receive and maintain at least one data card in fixed position above said plate, said support plate including a lateral substantially coplanar extension defining a trackway in substantial alignment with a card received by said formations, a tiltable elongate arm arranged over said support plate and supported by a depending formation riding in said trackway to permit motion of said arm both in the fore-and-aft direction of said trackway and for at least a limited swinging motion of said arm in a plane substantially parallel to and above said support plate, and a card-drilling device secured to one end of said arm so as to overlie the area of such card; said depending formation in engagement with said trackway being constructed to maintain said arm against rotation about its own lengthwise axis, whereby the axis of said card-drilling device is maintained substantially perpendicular to the plane of said support plate and the card thereon, regardless of the horizontal positioning of said card-drilling device.

2. Apparatus in accordance with claim 1, including a counter-weight secured to the opposite end of said arm; said depending formation extending downward from an intermediate location along said arm.

3. Apparatus in accordance with claim 1, and an arm-supporting member carried by said support plate between said formations and said trackway, to limit the downward tilting motion of said arm relative to said support plate.

4. Apparatus in accordance with claim 1, including a source of illumination in said housing, said support plate being apertured in the region encompassed by said locating formations, and a translucent card backing-plate disposed over said aperture and within said formations.

References Cited in the file of this patent

UNITED STATES PATENTS

| | | |
|---|---|---|
| 547,215 | Jaimison et al. | Oct. 1, 1895 |
| 1,545,424 | Heimrich | July 7, 1925 |
| 2,255,541 | Dremel | Sept. 9, 1941 |
| 2,267,336 | Kindelberger | Dec. 23, 1941 |
| 2,433,959 | Runkle | Jan. 6, 1948 |
| 2,548,197 | Conner | Apr. 10, 1951 |
| 3,052,150 | Jonker | Sept. 4, 1962 |

FOREIGN PATENTS

| | | |
|---|---|---|
| 17,340 | Austria | Aug. 25, 1904 |
| 520,517 | Italy | Mar. 22, 1955 |